United States Patent [19]

Kim

[11] 4,405,506

[45] Sep. 20, 1983

[54] SUPPORTED PLATINUM GROUP METAL CATALYSTS WITH CONTROLLED METAL PENETRATION

[75] Inventor: Gwan Kim, Columbia, Md.

[73] Assignee: W. R. Grace & Co., New York, N.Y.

[21] Appl. No.: 253,970

[22] Filed: Apr. 13, 1981

[51] Int. Cl.$^3$ .................. B01J 23/10; B01J 23/56; B01J 27/02

[52] U.S. Cl. .................. 252/462; 252/439; 252/466 PT; 423/213.5

[58] Field of Search ......... 252/439, 460, 462, 466 PT; 423/213.5

[56] References Cited

U.S. PATENT DOCUMENTS

| | | | |
|---|---|---|---|
| 3,932,309 | 1/1976 | Graham et al. | 423/213.5 X |
| 4,102,819 | 7/1978 | Petrow et al. | 252/460 |
| 4,128,506 | 12/1978 | Hegedus et al. | 423/213.5 X |
| 4,153,579 | 5/1979 | Summers et al. | 423/213.5 X |

OTHER PUBLICATIONS

Bailar, J. C. et al., *Comprehensive Inor. Chem;* vol. 3, Pergamon Press Ltd., Oxford, U.K., 1973; pp. 1248 & 1341.

*Primary Examiner*—Jack Cooper
*Attorney, Agent, or Firm*—Mark T. Collins

[57] ABSTRACT

A refractory inorganic oxide support is impregnated with a mixture of a platinum sulfito complex solution and a rhodium nitrate solution or with a mixture of a platinum sulfito complex solution, a rhodium nitrate solution, and a rhodium sulfito complex solution and the impregnated support is activated. The method produces a catalyst which has a maximum platinum concentration within 20 microns of the external surface of the support and at least about 70 percent of the total platinum located within 100 microns of the external surface of the support. The catalyst also has at least about 30 percent of the total rhodium located within 20 microns of the external surface of the support and at least about 40 percent of the total rhodium located at 20 to 100 microns from the external surface of the support.

28 Claims, No Drawings

SUPPORTED PLATINUM GROUP METAL CATALYSTS WITH CONTROLLED METAL PENETRATION

This invention relates to supported platinum group metal compositions that have controlled metal distributions and that are especially useful as automotive exhaust gas catalysts and to methods for preparing them.

A common deficiency of supported platinum group metal catalyst compositions is a significant decrease in activity due to hydrothermal sintering and poisoning when they are used for long periods of time at elevated temperatures in a variety of chemical processes. The high temperatures cause metal migration and interaction with each other and the support and loss of surface area and strength so that increased attrition, reactant channeling, and substantial loss of catalytic activity occur. This problem is particularly servere when the catalyst is employed in a moving motor vehicle where exhaust temperatures are frequently above 500° C. with excursions to 950° C. or higher. Further, an automotive exhaust catalyst is subjected to considerable mechanical vibration, relatively low temperatures during engine start-up, and a variety of relatively oxidizing and reducing atmospheres during engine idling, acceleration, and deceleration. Catalysts containing multiple platinum group metals and used for three-way conversion of carbon monoxide, hydrocarbons, and nitrogen oxides in automotive exhaust gases must be capable of both oxidation and reduction at low temperatures after engine start-up and maintain these activities under a variety of modes of engine operation and consequently of exhaust gas compositions, flow rates, and temperatures for economically feasible periods of time.

The resistance to poisoning and sintering and thus the sustained activity of an automotive exhaust catalyst are especially dependent upon the location and distribution of the catalytic ingredient on the support. Placement of platinum group metals on the support in the manner that achieves the best overall performance over the life of the catalyst is particularly significant since only small amounts of the metals can be economically used. Many competing phenomena are involved in the positioning of the platinum group metals. Impregnating the desired amount of metal over the greatest possible area by deep impregnation into the support provides maximum dispersion and catalytic surface area. Increased dispersion reduces the occurrence of crystallite growth of the catalytic metals and deeper impregnation may delay poisoning because the penetrating poisons may not reach the deeper catalytic layers until the required catalyst lifetime is obtained. However, since contact times are short in an automotive exhaust system and the catalysts employed have relatively small pore diameters, reaction rates may be diffusion controlled and the impregnation depth should not exceed the distance that reactants can effectively diffuse into the pore structure of the support. Metals located close to the exterior surface of the support are most effective in initial conversion but are also most susceptible to poisoning. A balance of impregnated surface area and dispersion with accessibility and poison resistance should be achieved to formulate an active and durable catalyst. Thus, the relative conversion efficiency as well as the relative susceptibility to poisoning of each metal must be considered in distributing the metals in the support.

In accordance with this invention, a refractory inorganic oxide support is impregnated with a mixture of a platinum sulfito complex solution and a rhodium nitrate solution. Preferably, the mixture also includes a rhodium sulfito complex solution. The catalysts produced by this invention have a maximum platinum concentration within 20 microns of the external surface of the support, at least about 70 percent of the total platinum located within 100 microns of the external surface of the support, at least about 30 percent of the total rhodium located within 20 microns of the external surface of the support, and at least about 40 percent of the total rhodium located at 20 to 100 microns from the external surface of the support. This platinum and rhodium distribution provides a three-way automotive exhaust catalyst of unexpectedly superior initial and sustained activity at lower rhodium contents.

A refractory inorganic support is employed in the present invention. These oxides have a high total pore volume and surface area. Generally, the surface area of the refractory oxide is at least about 50 square meters per gram, preferably from about 80 to about 300 square meters per gram, and the total pore volume is at least about 0.4 cubic centimeters per gram, preferably from about 0.5 to about 2.0 cubic centimeters per gram. The surface areas throughout this specification are determined by the nitrogen BET method and the total pore volumes are determined by adding water to a sample to the point where incipient wetness just occurs.

Generally, the refractory oxide is composed predominantly of oxides of one or more metals of Groups II, III, and IV having atomic numbers not exceeding 40. Suitable porous refractory inorganic oxides can be prepared by dehydrating, preferably substantially completely, the hydrate form of the oxide by calcination generally at temperatures of about 400° to about 1200° C. for periods of from about ½ to about 6 hours. The preferred refractory oxide is a transitional alumina, such as chi, rho, kappa, gamma, delta, eta, and theta alumina. Other suitable oxides include, for example, beryllia, zirconia, magnesia, and mixtures of metal oxides such as magnesia-alumina, silica-alumina, boria-alumina, and the like.

The support is preferably formed particles having various shapes such as spherical, spheroidal, cylindrical, polylobal, figure eight, cloverleaf, dumbbell, and the like. The support may be shaped by granulating, pelleting, extruding, molding, gelation, and other known methods. Spheroidal particles are preferred since they permit more uniform packing of the catalyst bed and are less subject to attrition than particles of other shapes. Additionally, the calcined support can be coated on a relatively catalytically inert substrate, such as a monolithic structure, and the platinum group metals then deposited. Generally, the support coating comprises from about 5 to about 20 percent based upon the weight of the substrate and the coating.

The refractory inorganic oxide may contain one or more other metal oxides that enhance the thermal stability of the support and/or the activity of the catalyst. Suitable metal oxides include one or more rare earth metal oxides and alkaline earth metal oxides and may generally comprise from about 1 to about 25 percent based upon the total weight of the support. Ceria-alumina supports containing from about 2 to about 15 percent ceria expressed as $CeO_2$ are especially preferred to provide enhanced thermal stability, dispersion of the platinum group metal, and catalytic activity. The rare earth or alkaline earth oxide-containing support may be prepared, for example, by impregnating the support with an aqueous solution of a thermally decomposable metal compound, such as the nitrate or acetate, in an amount sufficient to provide the desired oxide content. The impregnated support may be dried at a temperature of from about 90° to about 225° C. for about 2 to about 20 hours and calcined at a temperature of at least about 700° C. for at least about 1 hour.

To provide a catalyst composition in accordance with the present invention, the support is impregnated with a mixture of a platinum sulfito complex and a rhodium nitrate solution or with a mixture of a platinum sulfito complex solution, a rhodium nitrate solution, and a rhodium sulfito complex solution. Preferably, a palladium sulfito complex is deposited on the support prior to impregnation with the mixture.

Typically, the impregnation is performed by spraying the support with the impregnation solution or by immersing the support in the solution so that the desired level of pore saturation is achieved. The quantity of solution impregnated and its concentration of platinum group metal are selected to provide a catalyst composition containing catalytically effective amounts of platinum group metals and the balance of the catalyst composition is the support. Generally, the support may be impregnated with the solutions in amounts sufficient to provide a catalyst composition having a total platinum group metal content, based upon the total weight of the catalyst composition, from about 0.005 to about 1 weight percent and preferably from about 0.03 to about 0.03 weight percent to be both economically and technically feasible. The supports may be impregnated with the solutions in amounts sufficient to provide a catalyst composition that comprises from about 0.02 to about 0.2 weight percent platinum, from about 0.005 to about 0.1 weight percent palladium, and from about 0.001 to about 0.05 weight percent rhodium, based upon the total weight of the catalyst composition.

The sulfito complexes of platinum, palladium and rhodium generally contain from 1 to 4 sulfito groups per atom of platinum group metal. The number of sulfito groups and other ligands, such as chloride and hydroxyl ions, in the complexes varies with the bisulfite and sulfite concentration, temperature, and reaction time employed in their preparation. Cations, such as hydrogen ions or ammonium ions, may be present in the complex or in the solution with the platinum group metal sulfito complex anions. Suitable complexes include ammonium and acid disulfito, tetrasulfito, and disulfito-diammine complexes of platinum or palladium. These complexes have the empirical formula $M_2(X)(SO_3)_2$, $M_6(X)(SO_3)_4$, and $M_2(X)(SO_3)_2(NH_3)_2$, wherein M is $NH_4^+$ or $H^{3O}$ and X is platinum or palladium. For example, these complexes include $(NH_4)_6Pt(SO_3)_4$, $(NH_4)_2Pt(SO_3)_2$, $(NH_4)_2Pt(SO_3)_2(NH_3)_2$, $H_6Pt(SO_3)_4$, $H_2Pt(SO_3)_2$, $H_2Pt(SO_3)_2(NH_3)_2$, $(NH_4)_6Pd(SO_3)_4$, $(NH_4)_2Pd(SO_3)_2$, $(NH_4)_2Pd(SO_3)_2(NH_3)_2$, $H_6Pd(SO_3)_4$, $H_2Pd(SO_3)_2$, and $H_2Pd(SO_3)_2(NH_3)_2$. Suitable rhodium sulfito complexes include acid trisulfito and ammonium and acid trisulfito-triammine complexes. These complexes have the empirical formulas $(H)_3(Rh)(SO_3)_3$, $(NH_4)_3(Rh)(SO_3)_3(NH_3)_n$, and $(H)_3(Rh)(SO_3)_3(NH_3)_n$, wherein n is 1, 2, or 3. For example, the complexes include $(NH_4)_3Rh(SO_3)_3(NH_3)_3$, $H_3Rh(SO_3)_3(NH_3)_3$, and $H_3Rh(SO_3)_3$. Of course, the number of the sulfito and other ligands in the complex will vary from these formulas in an in-situ solution.

Generally, the sulfito complexes are prepared by treating a platinum group metal compound in an aqueous medium with a sulfiting agent comprising ammonium bisulfite and sulfurous acid. Generally, from about 1 to about 6, preferably about 3, moles of $SO_2$ per gram atom of platinum group metal are used and the reaction may be conducted at a temperature of from about 20 to about 100° C. for at least about 15 minutes. The acid complexes may be conveniently prepared at about 40° to about 80° C. in about ½ to about 2 hours or at about 20° to about 30° C. in about 16 to about 24 hours. The acid complexes may also be prepared by cation exchange of an ammonium sulfito complex with an acid resin. The resin is employed in an amount sufficient to replace the ammonium ions in the complex. The ammine complexes may be prepared by treating an ammonium or acid sulfito complex with ammonium hydroxide, an ammonium salt, or a mixture thereof. The stoichiometric amount sufficient to provide the desired number of ammine groups may be used.

For example, the platinum and palladium ammonium and acid sulfito complexes may be prepared in accordance with the procedures described in U.S. Pat. No. 3,932,309 to Graham et al. In this patent, solutions of the ammonium salts of platinum and palladium sulfito complexes are prepared by reacting ammonium bisulfite with chloroplatinic acid and palladium nitrate respectively. Palladium chloride may also be used. The solution of the resulting in-situ complex or a solution prepared by isolating and redissolving the complex may be used to impregnate the support. The in-situ acid form of platinum or palladium sulfito complexes can be prepared by reacting an aqueous solution of the platinum or palladium compound with sulfur dioxide. Sulfurous acid may also be used.

Solutions of the ammonium and acid sulfito complexes of rhodium may be prepared by the addition of rhodium chloride to ammonium bisulfite or sulfurous acid respectively in an aqueous medium. An acid complex of any of the platinum group metals can also be prepared by cation exchange of the ammonium complexes. If desired, the complexes may be precipitated with methyl or ethyl alcohol and isolated.

The ammonium sulfito ammine complexes of platinum and palladium can be prepared by adding ammonium hydroxide, an ammonium salt, such as ammonium carbonate, or mixtures thereof to the corresponding ammonium sulfito complexes in the stoichiometric amount to form the desired complex. The ammonium rhodium ammine complex may be prepared by adding rhodium chloride solution to ammonium bisulfite solution. The ammine complexes can be isolated by precipitation with methyl or ethyl alcohol. The acid ammine complexes may be prepared by cation exchange of the ammonium ammine complexes.

In a preferred catalyst of this invention, the support is first impregnated with palladium sulfito complex solution. Impregnation with a solution of an acid palladium complex is especially preferred to enhance three-way conversion activity.

The penetration of the acid complex in this or later impregnation steps may be increased by including a penetration aid in the impregnation solution. Suitable penetration aids include the organic acids described in U.S. Pat. No. 3,259,589 to Michalko, herein incorporated by reference, and ammonium salts thereof. The penetration aid is preferably selected from the group consisting of dibasic acids having the formula

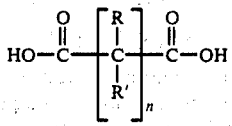

wherein R is selected from hydrogen, hydroxyl and alkyl groups; R' is selected from hydrogen, alkyl and carboxyl groups; and n is within the range of 0 to 6; and ammonium salts thereof. Dibasic ammonium citrate is especially preferred as the penetration aid. The amount of penetration aid employed is based on the amount of the support. The penetration aid is incorporated in the impregnation solution in an amount of from about 0.1 to about 1.5 percent by weight of the support or of from about 1 to about 5 millimoles per liter of the support.

The support may be impregnated with the palladium sulfito complex solution to a portion or all of its water pore volume depending upon the amount of palladium desired in the catalyst composition. If necessary to provide accessible pore volume for the next impregnation step, the impregnated support may be dried at a temperature of from about 90 to about 225° C. for about 2 to about 20 hours to remove the solvent.

The support may then be impregnated with a mixture comprising a platinum sulfito complex solution and a rhodium nitrate solution. Preferably, the mixture also contains a rhodium sulfito complex solution. This three-component mixture provides an especially durable three-way catalyst for automotive exhaust emissions control.

The platinum sulfito complex solution is generally employed in the mixture in an amount sufficient to provide a platinum to rhodium weight ratio in the mixture of from about 20 to 1 to about 3 to 1 and preferably of from about 12 to 1 about 5 to 1. Generally the concentrations of each rhodium-containing solution and their relative amounts in the mixture are sufficient to provide from about 30 to about 70 weight percent of the total rhodium in the mixture from each solution. Preferably, from about 40 to about 60 weight percent of the rhodium in the mixture is provided by each solution. The use of sufficient amounts of each solution to provide a weight ratio in the mixture of about 1 to 1 of rhodium from each solution is especially preferred.

Prior to impregnation on the support, the pH of the mixture may be raised to about 1 to about 7, preferably from about 1.5 to 5, to avoid excessive accumulation at the exterior surface and excessive penetration into the interior of the platinum and rhodium metals. An ammonium hydroxide solution is conveniently employed for pH adjustment.

After completion of the addition of the platinum group metals, the catalyst composition may be dried at a temperature of from about 90° to about 225° C. for about 2 to about 20 hours. Drying serves to remove the impregnation medium and deposit the final platinum group metal compound on the support. If desired, removal of the impregnation medium may be carried out in a drying step or as a part of the activation procedure. The composition may be activated by heating under conditions which provide a composition having characteristics that promote the desired reaction. This activation stabilizes the catalyst so that, during the initial stages of use, its activity is not materially altered. The temperature of this activation is low enough to prevent substantial sintering of the catalyst which would cause substantial occlusion of the platinum group metal component. Thus, the catalyst may be activated by heating in a reducing atmosphere, such as a mixture of nitrogen and hydrogen, at a temperature of from about 200° to about 800° C., preferably from about 350° to about 700° C., for about ½ to about 4 hours, or simply in air at temperatures of from about 250° to about 500° C. for about ½ to about 4 hours. Activation in a reducing atmosphere is preferred since it improves hydrocarbon and carbon monoxide conversions.

The catalyst composition of the present invention comprises platinum and rhodium deposited on a refractory inorganic support. The metal distribution of the catalysts of the present invention balances the susceptibility of each metal to poisoning and the degree to which its activity is dependent on reactant diffusion into the pores. The metal distributions disclosed throughout this specification were determined by the chloroform attrition method. In this method, 100 grams of catalyst are agitated in chloroform for a specified length of time dependent on the amount of catalyst surface to be attrited. The attrited material is separated from the unattrited remainder, dried, and weighed. The attrited material and the remainder on completion of the attritions are analyzed for their respective contents of platinum, palladium and rhodium by X-ray fluorescence spectroscopy. The depth removed is determined from the initial dimensions of the catalyst as well as its geometry and weight and the platinum group metal weight percentages are calculated as a function of distance from the exterior surface.

The maximum concentration of platinum is within 20 microns (i.e., at a depth of less than or equal to 20 microns) of the exterior surface of the support and the platinum concentration decreases with increasing penetration of the support at a rate so that at least about 70 percent of the total platinum is within 100 microns of the external surface. Preferably, at least about 90 percent of the total platinum is located within 100 microns of the external support and at least about 20 percent of the total platinum is located within 20 microns of the external surface of the support.

The concentration of rhodium is relatively high at or near the exterior surface of the support. The maximum rhodium concentration occurs within 20 microns of the exterior surface of the support. Generally, at least about 30 percent, preferably at least about 35 percent, of the total rhodium is within 20 microns of the external surface and at least about 40 percent, preferably at least about 50 percent, of the total rhodium is located at 20 to 100 microns from the external surface. Preferably, the catalyst has less than about 5 percent of the total rhodium located at more than 100 microns from the external surface of the support and at least about 20 percent of the total rhodium is located within 10 microns of the external surface of the support.

A substantial concentration of palladium, when included, is also present at or near the exterior surface of the support. Generally, at least about 10 percent of the palladium is located within 20 microns, from about 30 to about 60 percent of the palladium is located within 100 microns, and from about 70 to about 90 weight percent is located within 200 microns of the external surface of the support.

Catalysts prepared by impregnation of a mixture of platinum sulfito complex solution, rhodium nitrate solution, and rhodium sulfito solution are substantially more durable and thus highly preferred embodiments of this invention. These catalysts have at least about 20 percent of the total rhodium and a maximum rhodium concentration located within 10 microns of the external surface of the support, at least about 35 percent of the total rhodium located within 20 microns of the external surface of the support, from about 45 to about 55 percent of the total rhodium within 20 to 100 microns from the external surface of the support, and less than about 5 percent of the total rhodium more than 100 microns from the external surface of the support.

The following examples illustrate the preparation and use of illustrative catalyst compositions prepared in accordance with this invention. All parts and percentages in the examples are by weight unless otherwise indicated.

EXAMPLE 1

Spheroidal alumina particles were calcined in air for 1 hour at 1030° C. and impregnated with a cerous nitrate solution to incipient wetness. The impregnated particles were dried in 135° C. air and calcined for 1 hour in air at about 750° C. The calcined particles contained 3 weight percent $CeO_2$ and had a compacted bulk density of 0.507 gram per cubic centimeter, a total pore volume of 0.86 cubic centimeter per gram, and a surface area of 110 square meters per gram.

A palladium sulfito complex solution was prepared by contacting at room temperature a palladium nitrate solution containing 1.000 gram of palladium with a sulfurous acid solution containing 2.71 grams of $SO_2$. The resulting solution was diluted to exactly 250 milliliters and contained 4 grams of palladium per liter of solution.

A platinum sulfito complex solution was prepared by contacting at room temperature a chloroplatinic acid solution containing 2.000 grams of platinum with a sulfurous acid solution containing 2.96 grams of $SO_2$ and heating the solution for 90 minutes in 60° C. water. After cooling to room temperature, the colorless solution was diluted to exactly 500 milliliters and contained 4 grams of platinum per liter of solution.

A rhodium nitrate solution containing 2 grams of rhodium per liter of solution was freshly prepared by diluting a concentrated rhodium nitrate solution. A portion of this solution containing 43.8 milligrams of rhodium was added to a portion of the above-prepared platinum sulfito complex solution containing 219 milligrams of platinum. The mixture was diluted to a total volume sufficient to impregnate 152.2 grams of the ceria-alumina particles to 90 percent of incipient wetness and the pH was adjusted to 1.43 with concentrated ammonium hydroxide.

152.2 grams of the ceria-alumina particles were sprayed with a fine mist of the palladium sulfito complex solution containing 87.6 milligrams of palladium and 170 milligrams of dibasic ammonium citrate, using a total volume of the solution sufficient to reach 95 percent of incipient wetness. The particles were then dried for 3 hours in 135° C. air. The dried particles were sprayed with the mixture of platinum sulfito complex solution and rhodium nitrate solution using a total volume sufficient to reach 90 percent of incipient wetness. The impregnated particles were again dried for 3 hours in 135° C. air and then reduced for 1 hour in a flowing mixture of 5 volume percent hydrogen and 95 volume percent nitrogen at 400° C. The resulting catalyst contained 0.730, 0.292, and 0.144 grams per liter respectively of platinum, palladium, and rhodium.

EXAMPLE 2

A rhodium sulfito complex solution was prepared by contacting at room temperature an aqueous solution of rhodium trichloride and hydrochloric acid containing 0.200 grams of rhodium with a sulfurous acid solution containing 0.374 gram of $SO_2$ and then heating the solution for 2 hours in 55° C. water. After cooling to room temperature, the solution was diluted to exactly 100 milliliters and the resulting solution contained 2 grams of rhodium per liter of solution.

A catalyst was prepared in accordance with the procedure of Example 1 except that the rhodium sulfito complex solution was added to the mixture in an amount so that ⅔ of the rhodium was provided by the rhodium nitrate solution and ⅓ of the rhodium was provided by the rhodium sulfito complex solution and the pH of the mixture was adjusted to 1.39 with concentrated ammonium hydroxide.

EXAMPLE 3

A catalyst was prepared in accordance with the procedure of Example 2 except that ½ of the rhodium in the mixture was provided by the rhodium nitrate solution and the other ½ from the rhodium sulfito complex solution and the pH of the mixture was adjusted to 1.36 with concentrated ammonium hydroxide.

EXAMPLE 4

The pH of a portion of the platinum sulfito complex solution of Example 1 containing 131.4 milligrams of platinum was adjusted to 1.20 with concentrated ammonium hydroxide and a portion of the rhodium nitrate solution of Example 1 containing 43.8 milligrams of rhodium was added to the solution. The resulting mixture was diluted to a total volume sufficient to impregnate 152.2 grams of the calcined ceria-alumina particles of Example 1 to 90 percent of incipient wetness.

152.2 grams of the ceria-alumina particles were sprayed with a fine mist of a portion of the palladium sulfito complex solution of Example 1 containing 131.4 milligrams of palladium and 170 milligrams of dibasic ammonium citrate in a total volume sufficient to reach 95 percent of incipient wetness. The particles were then dried for 3 hours in 135° C. air and sprayed with the mixture of platinum sulfito complex solution and rhodium nitrate solution in a total volume sufficient to reach 90 percent of incipient wetness. The impregnated particles were then dried and reduced in the same manner as in Example 1. The resulting catalyst contained 0.432, 0.432, and 0.144 grams per liter respectively of platinum, palladium, and rhodium.

EXAMPLE 5

A portion of the rhodium nitrate solution of Example 1 containing 17.8 milligrams of rhodium was added to a portion of the platinum sulfito complex solution of Example 1 containing 177.9 milligrams of platinum and the pH of the mixture was adjusted to 1.56 with concentrated ammonium hydroxide. The resulting mixture was diluted to a total volume sufficient to impregnate 152.2 grams of the calcined ceria-alumina particles of Example 1 to 90 percent incipient wetness.

152.2 grams of the ceria-alumina particles were sprayed with a fine mist of a portion of the palladium sulfito complex solution of Example 1 containing 71.2 milligrams of palladium and 170 milligrams of dibasic ammonium citrate in a total volume sufficient to reach 95 percent of incipient wetness. The particles were then dried for 3 hours in 135° C. air and sprayed with the mixture of platinum sulfito complex solution and rhodium nitrate solution in a total volume sufficient to reach 90 percent of incipient wetness. The impregnated particles were dried for 3 hours in 135° C. air and reduced in a flowing mixture of 5 volume percent hydrogen and 95 volume percent nitrogen for 1 hour at 400° C. The resulting catalyst contained 0.593, 0.237, and 0.0593 grams per liter respectively of platinum, palladium, and rhodium.

EXAMPLE 6

A catalyst was prepared by the procedure of Example 5 except that the rhodium sulfito complex solution of Example 2 was added to the mixture in an amount so that ½ of the rhodium was provided by the rhodium nitrate solution and the other ½ of the rhodium was provided by the rhodium sulfito complex solution and the pH of the mixture was adjusted to 1.53 with concentrated ammonium hydroxide.

EXAMPLE 7

An ammonium platinum sulfito complex solution was prepared by contacting at room temperature a chloroplatinic acid solution containing 1.005 grams of platinum with 220 grams of an aqueous solution containing 5.84 grams of 42.1 weight percent ammonium bisulfite solution and sufficient ammonium hydroxide to provide a pH of about 8.9. The colorless solution was diluted to exactly 335 grams.

A catalyst was prepared by the procedure of Example 6 except that the above-prepared ammonium platinum sulfito complex solution was substituted for the acid platinum sulfito complex solution and the pH of the mixture was adjusted to 2.31 prior to impregnation.

The fresh three-way conversion efficiency of the catalysts of this invention was evaluated in a down-flow Vycor glass reactor with an internal diameter of 2.2 centimeters using the gaseous feed shown in Table 1, a sample of 8.5 milliliters, and a total gas hourly space velocity of 60,000.

TABLE I

| Gas | Volume % |
|---|---|
| $HC(C_3H_6/C_3H_8 = 3/1)$ | 0.040 |
| CO | 0.225~0.756 |
| $H_2$ | 0.075~0.252 |
| NO | 0.185 |
| $O_2$ | 0.245~0.725 |
| $CO_2$ | 14.5 |
| $H_2O$ | 10.0 |
| $N_2$ | Balance |

An auxiliary CO and $H_2$ feed and $O_2$ feed were alternately turned on and off for ½ second and the inlet gas temperature was 482° C. as measured 0.635 centimeter above the catalyst bed. In this test, conversion efficiencies (% conversion) were determined as a function of the stoichiometry ratio of the feed as shown in Table III.

After the fresh activity test, the catalysts were subjected to approximately 190 hours of accelerated aging that was nearly equivalent to 800 to 1000 hours of aging on a standing engine dynamometer. The conditions of accelerated aging are shown in Table II.

TABLE II

| Accelerated Aging Conditions | |
|---|---|
| Aging Temperature (Average bed) | Cycled between 593° C. (2 hrs.) and 760° C. (0.4 hr.) |
| Average Gas Hourly Space Velocity | 36,700 |
| Fuel Feed Rate | 1.77 liters/liter catalyst/hr. |
| Fuel Composition | n-Hexane containing 0.10 g Pb/gal., 0.25 g P/gal., and 0.04 Wt. % S |

The fresh and aged activities of catalysts of this invention are shown in Table III.

TABLE III

Performance of Pt-Pd-Rh TWC's

| | | | % Conversion | | | | | | | | |
|---|---|---|---|---|---|---|---|---|---|---|---|
| | | | $R^c = 0.5$ | | | | R = x | | R = 1.5 | | |
| Example Number | Rhodium source | Fresh or Aged | HC | CO | NO | NO (net) | HC | CO/NO | HC | CO | NO |
| $1^a$ | nitrate | F | 82 | 58 | 96 | 77 | 96 | 88 | 94 | 94 | 54 |
| | | A | 53 | 42 | 67 | 45 | 59 | 47 | 60 | 52 | 33 |
| $2^a$ | ⅔ nitrate and ⅓ sulfito complex | F | 83 | 57 | 94 | 78 | 96 | 87 | 94 | 92 | 51 |
| | | A | 59 | 41 | 67 | 45 | 62 | 48 | 62 | 55 | 32 |
| $3^a$ | ½ nitrate and ½ sulfito complex | F | 83 | 57 | 94 | 79 | 95 | 87 | 93 | 92 | 50 |
| | | A | 60 | 45 | 66 | 45 | 65 | 49 | 64 | 56 | 32 |
| $5^b$ | nitrate | F | 91 | 65 | 93 | — | 68 | 88 | 93 | 92 | 55 |
| | | A | 57 | 37 | 59 | — | 61 | 41 | 61 | 46 | 30 |
| $6^b$ | ½ nitrate and ½ sulfito complex | F | 90 | 62 | 93 | — | 95 | 85 | 92 | 92 | 54 |
| | | A | 60 | 39 | 63 | — | 64 | 45 | 64 | 51 | 34 |

$^a$These catalysts all contained 1.168 grams of platinum group metals per liter of catalyst at a Pt/Pd/Rh weight ratio of 5/2/1.
$^b$These catalysts all contain 0.889 gram of total platinum group metals per liter of catalyst at a Pt/Pd/Rh weight ratio of 10/4/1.
$^c$Stoichiometry ratio of the feed as defined by $R = ([O_2] + 0.5 [NO]/[0.185 + 0.5 ([CO] + [H_2])])$. Thus, R = 0.5 and 1.5 represent 50% $O_2$-deficient and 50% $O_2$-excess conditions, respectively. R = x represents the stoichiometry ratio where CO conversions vs. R and NO conversion vs. R curves cross-over each other, and usually is located near R = 1.0.

Metal distributions by the chloroforms attrition method of catalysts of this invention are shown in Table IV.

TABLE IV

| | | | | Metals Distribution vs. Penetration Depth | | | | | |
|---|---|---|---|---|---|---|---|---|---|
| Example Number | Rhodium Source | M | Depth (micron) | Cumulative % of Each Metal (M) Loaded | | | | | |
| | | | | 20 | 50 | 75 | 100 | 150 | 200 |
| 4 | Nitrate | Pt | | 31 | 67 | 84 | 91.5 | 97 | 98.4 |
| | | Pd | | 14 | 29 | 39 | 46 | 67 | 77 |
| | | Rh | | 38 | 77 | 91 | 95.4 | 98.2 | 99.1 |
| 5 | Nitrate | Pt | | 34 | 66 | 79.5 | 87 | 94.5 | 97.4 |
| | | Pd | | 13 | 28 | 36.7 | 44 | 57.5 | 68 |
| | | Rh | | 45 | 80.5 | 91.8 | 95.9 | 98.4 | 99.2 |
| 6 | ½ Nitrate + | Pt | | 28 | 57 | 71 | 81 | 91.2 | 95.4 |
| | ½ Sulfito | Pd | | 10 | 20 | 28 | 34 | 45.5 | 56 |
| | Complex | Rh | | 32 | 65 | 83 | 93 | 99.2 | 100 |
| 7 | ½ Nitrate + | Pt | | 22 | 48 | 64.5 | 75 | 88.3 | 94.5 |
| | ½ Sulfito | Pd | | 10 | 24 | 35 | 44 | 60 | 72 |
| | Complex | Rh | | 52 | 83 | 92 | 95.4 | 98.9 | 100 |

What is claimed is:

1. A catalyst composition comprising platinum, palladium and rhodium deposited on a refractory inorganic oxide support and having a maximum platinum concentration within 20 microns of the exterior surface of the support, at least about 70 percent of the total platinum located within 100 microns of the external surface of the support, at least about 10 percent of the total palladium located within 20 microns of the external surface of the support, a maximum rhodium concentration within 20 microns of the external surface of the support, at least about 30 percent of the total rhodium located within 20 microns of the external surface of the support, and at least about 40 percent of the total rhodium located at 20 to 100 microns from the external surface of the support.

2. The catalyst composition of claim 1 having at least about 35 percent of the total rhodium within 20 microns of the external surface of the support.

3. The catalyst composition of claim 1 having at least about 50 percent of the total rhodium located at 20 to 100 microns from the external surface of the support.

4. The catalyst composition of claim 1 having less than about 5 percent of the total rhodium located at more than 100 microns from the external surface of the support.

5. The catalyst composition of claim 1 having at least about 20 percent of the total rhodium located within 10 microns of the external surface of the support.

6. The catalyst composition of claim 1 having at least about 90 percent of the total platinum located within 100 microns of the external surface of the support.

7. The catalyst composition of claim 1 having at least about 20 percent of the total platinum located within 20 microns of the external surface of the support.

8. The catalyst composition of claim 1 having from about 30 to about 60 percent of the total palladium located within 100 microns of the external surface of the support.

9. The catalyst composition of claim 1 having from about 70 to about 90 percent of the total palladium located within 200 microns of the external surface of the support.

10. The catalyst composition of claim 1 in which the support comprises shaped spheroidal alumina particles.

11. The catalyst composition of claim 1 in which the support comprises shaped spheroidal ceria-alumina particles.

12. A method of preparing the catalyst composition of claim 11 comprising impregnating shaped spheroidal ceria-alumina particles with a palladium sulfito complex solution; impregnating the particles with a mixture of an acid in situ platinum sulfito complex solution, a rhodium nitrate solution, and an acid in situ rhodium sulfito complex solution, said mixture containing sufficient amounts of each rhodium solution so that each rhodium solution provides from about 40 to about 60 percent of the total rhodium in the mixture; and activating the impregnated particles.

13. A method of preparing the catalyst composition of claim 1 comprising impregnating a refractory inorganic oxide support with a palladium sulfito complex solution; impregnating the support with a mixture of a platinum sulfito complex solution, a rhodium nitrate solution, and a rhodium sulfito complex solution, said rhodium nitrate solution and rhodium sulfito complex solution being present in the mixture in amounts such that from about 30 to about 70 weight percent of the total rhodium in the mixture is provided by each solution; and activating the impregnated support.

14. The method of claim 13 in which the amounts of rhodium nitrate solution and rhodium sulfito complex solution in the mixture are such that from about 40 to about 60 weight percent of the total rhodium in the mixture is provided by each solution.

15. The method of claim 13 in which the rhodium sulfito complex solution is an acid complex in situ solution.

16. The method of claim 13 in which the platinum sulfito complex solution is an acid in situ solution.

17. The method of claim 13 in which the palladium sulfito complex solution is impregnated prior to impregnation of the mixture.

18. The method of claim 13 in which the palladium sulfito complex solution is an acid complex in situ solution.

19. The method of claim 13 in which the palladium sulfito complex solution further comprises dibasic ammonium citrate.

20. The method of claim 13 further comprising adjusting the pH of the mixture to about 1 to about 7 prior to impregnation.

21. The method of claim 13 further comprising adjusting the pH of the mixture to about 1.5 to about 5 prior to impregnation.

22. The method of claim 13 in which the platinum sulfito complex contains from about 1 to about 4 sulfito groups per atom of platinum.

23. The method of claim 13 in which the rhodium sulfito complex contains from about 1 to about 3 sulfito groups per atom of rhodium.

24. The method of claim 13 in which the rhodium sulfito complex is prepared by reacting rhodium trichloride with sulfurous acid for ½ to 2 hours at about 40 to about 80° C.

25. The method of claim 13 in which the rhodium sulfito complex is prepared by reacting rhodium trichloride with sulfurous acid for about 16 to about 24 hours at about 20 to about 30° C.

26. The method of claim 13 in which the support comprises shaped spheroidal alumina particles.

27. The method of claim 13 in which the support comprises shaped spheroidal ceria-alumina particles.

28. A catalyst composition comprising platinum, palladium, and rhodium deposited on shaped spheroidal ceria-alumina particles and having a maximum platinum concentration within 20 microns of the external surface of the particles, at least about 70 percent of the total platinum located within 100 microns of the external surface of the particles, at least about 10 percent of the total palladium located within 20 microns of the external surface of the particles, at least about 20 percent of the total rhodium and a maximum rhodium concentration located within 10 microns of the external surface of the particles, at least about 35 percent of the total rhodium located within 20 microns of the external surface of the particles, from about 45 to about 55 percent of the total rhodium located at 20 to 100 microns from the external surface of the particles, and less than about 5 percent of the total rhodium located more than 100 microns from the external surface of the support.

* * * * *